United States Patent
Nakajima et al.

(10) Patent No.: US 11,609,998 B2
(45) Date of Patent: Mar. 21, 2023

(54) DEVICE, METHOD, AND COMPUTER PROGRAM FOR SUPPORTING SPECIFICATION

(71) Applicant: NIPPON TELEGRAPH AND TELEPHONE CORPORATION, Tokyo (JP)

(72) Inventors: Asuka Nakajima, Musashino (JP); Makoto Iwamura, Musashino (JP); Takeo Hariu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 172 days.

(21) Appl. No.: 16/619,986

(22) PCT Filed: May 8, 2018

(86) PCT No.: PCT/JP2018/017787
§ 371 (c)(1),
(2) Date: Dec. 6, 2019

(87) PCT Pub. No.: WO2018/230194
PCT Pub. Date: Dec. 20, 2018

(65) Prior Publication Data
US 2020/0097664 A1  Mar. 26, 2020

(30) Foreign Application Priority Data
Jun. 14, 2017 (JP) .............................. JP2017-116668

(51) Int. Cl.
*G06F 21/57* (2013.01)
*G06F 8/74* (2018.01)

(52) U.S. Cl.
CPC .............. *G06F 21/577* (2013.01); *G06F 8/74* (2013.01); *G06F 2221/033* (2013.01)

(58) Field of Classification Search
None
See application file for complete search history.

(56) References Cited

U.S. PATENT DOCUMENTS

2009/0013405 A1*  1/2009  Schipka ................ G06F 21/562
                                                                726/22
2009/0158434 A1*  6/2009  Yoo ....................... G06F 21/563
                                                                726/24

(Continued)

FOREIGN PATENT DOCUMENTS

JP      5009186 B2    8/2012
WO  2017/61270 A1    4/2017

OTHER PUBLICATIONS

International Search Report and Written Opinion dated Aug. 7, 2018 for PCT/JP2018/017787 filed on May 8, 2018, 8 pages including English Translation of the International Search Report.

(Continued)

*Primary Examiner* — Fatoumata Traore
(74) *Attorney, Agent, or Firm* — Xsensus LLP

(57) ABSTRACT

A difference extracting unit extracts, from an executable file converted from a source code and an executable file converted from a source code after vulnerability correction is made to the source code, a difference of a part where the vulnerability correction is made. A feature calculating unit calculates features of the difference extracted by the difference extracting unit. A difference extracting unit extracts, from an executable file converted from a source code and an executable file converted from a source code after correction is made to the source code, a difference of a predetermined part. A similarity calculating unit calculates similarity between the difference of the predetermined part calculated by the difference extracting unit and the features of the (Continued)

difference of the part where the vulnerability correction is made calculated by the feature calculating unit.

8 Claims, 9 Drawing Sheets

(56) References Cited

U.S. PATENT DOCUMENTS

| | | | | |
|---|---|---|---|---|
| 2009/0313700 | A1* | 12/2009 | Horne | G06F 21/564 |
| | | | | 726/24 |
| 2012/0011493 | A1 | 1/2012 | Singh et al. | |
| 2015/0058984 | A1* | 2/2015 | Shen | G06F 21/568 |
| | | | | 726/23 |
| 2017/0286692 | A1* | 10/2017 | Nakajima | G06F 21/57 |
| 2017/0293761 | A1* | 10/2017 | Rhee | G06F 11/3688 |
| 2017/0300691 | A1* | 10/2017 | Upchurch | G06F 16/358 |

OTHER PUBLICATIONS

Flake, H., "Structural Comparison of Executable Objects," IEEE Conference on Detection of Intrusions and Malware & Vulnerability Assessment (DIMVA), Dortmund, Germany, Jul. 6-7, 2004, 13 pages.

Oh, J., "ExploitSpotting: Locating Vulnerabilities Out of Vendor Patches Automatically," Las Vegas, USA, Aug. 1, 2010, 69 pages.

Schwarz, B., et al., "Disassembly of executable code revisited," Proceedings of the Ninth Working Conference on Reverse Engineering, IEEE, Oct. 29-Nov. 1, 2002, 10 pages.

Asakura, Y. and Masakatu, M., "A Generation of Exploit Codes Using Vulnerability Patchs," Abstracts of the 2010 Symposium of Cryptography and Information Security, Jan. 19, 2010, pp. 1-7.

* cited by examiner

FIG.2

```
@@-192+193,5@@
+   for(i=0;i<=(INT_MAX/4)&&
       isxdigit((unsigned char)a[i]);i++)
+     continue;
+
+   if(i>INT_MAX/4)
+     goto err;
```

FIG.3

```
BN_bn2hex    function    69 bn_print.c char *BN_bn2hex(const BIGNUM *a)
BN_bn2dec    function    107 bn_print.c char *BN_bn2dec(const BIGNUM *a)
BN_hex2bn    function    178 bn_print.c int BN_hex2bn(BIGNUM **bn, const char *a)
BN_dec2bn    function    254 bn_print.c int BN_dec2bn(BIGNUM **bn, const char *a)
BN_asc2bn    function    321 bn_print.c int BN_asc2bn(BIGNUM **bn, const char *a)
BN_print_fp  function    341 bn_print.c int BN_print_fp(FILE *fp, const BIGNUM *a)
BN_print     function    355 bn_print.c int BN_print(BIO *bp, const BIGNUM *a)
BN_options   function    381 bn_print.c char *BN_options(void)
```

FIG.4

```
BN_hex2bn:
push        ebp
push        edi
push        esi
push        ebx
sub         esp, 0x2c
mov         esi, DWORD PTR [esp+0x44]
test        esi, esi
je          8107af0 <BN_hex2bn+0x1c0>
mov         eax, DWORD PTR [esp+0x44]
movzx       eax, BYTE PTR [eax]
test        al, al
je          8107af0 <BN_hex2bn+0x1c0>
cmp         al, 0x2d
mov         DWORD PTR [esp+0xc], 0x0
...
```

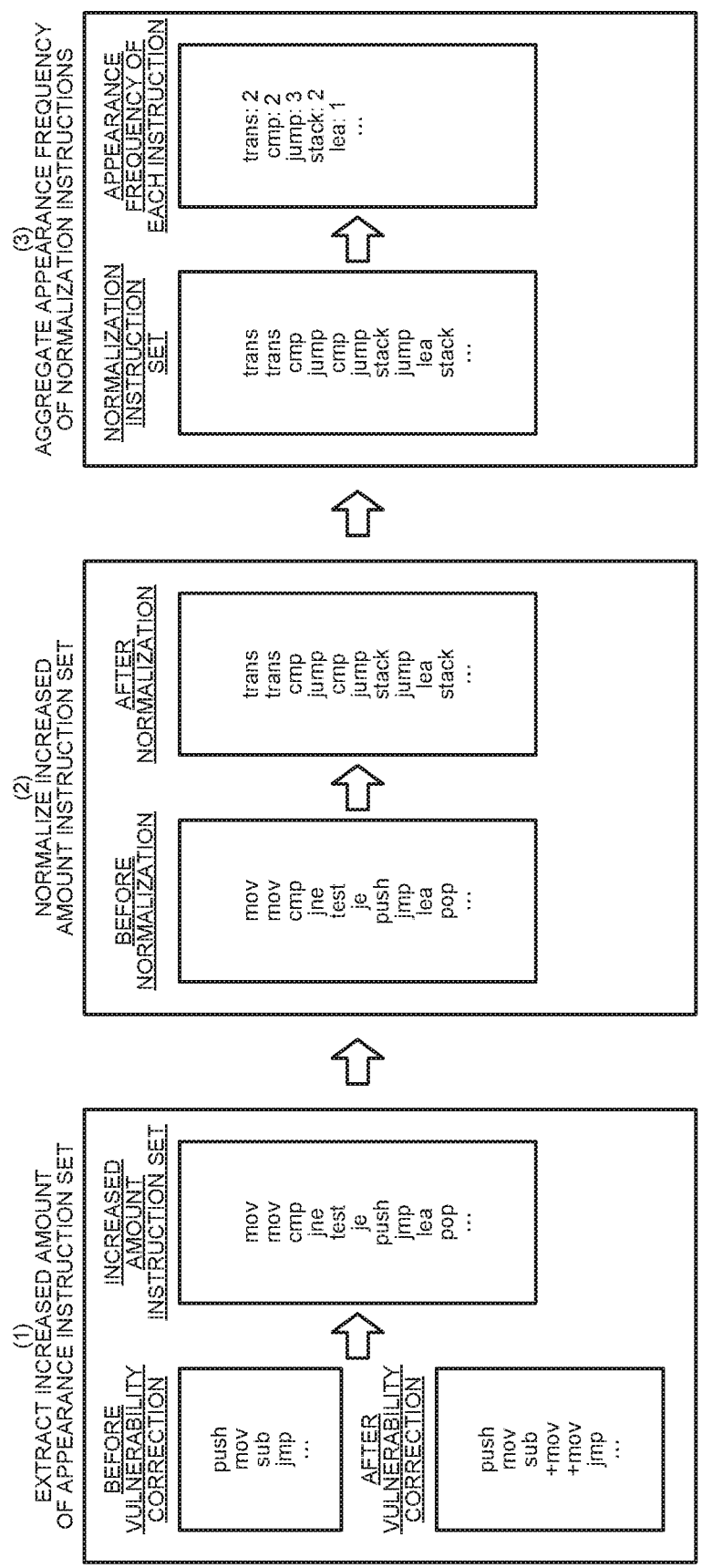

FIG.6

| EXAMPLE OF NORMALIZATION INSTRUCTIONS | KIND OF INSTRUCTIONS | EXAMPLE OF INSTRUCTIONS TO BE NORMALIZED |
|---|---|---|
| jump | BRANCH | jns, jle, jne, jge, jae, jmp, js, jl, je, jg, ja, jb, jbe |
| trans | DATA TRANSFER | movxz, mov, movsx, xchg, cdq |
| ctrans | CONDITIONAL DATA TRANSFER | cmovge, cmovae, cmovs, cmovns, cmove, cmovne |
| stack | STACK OPERATION | push, pop |
| logical | LOGICAL OPERATION | and, xor, or, not |
| arith | ARITHMETIC OPERATION | sub, add, imul, neg, adc |
| nop | NO OPERATION | nop |
| bop | BIT/BYTE OPERATION | bt, setne, sete |
| shift | SHIFT OPERATION | shr, shl, sar |
| func | FUNCTION OPERATION | call, ret |
| str | CHARACTER STRING OPERATION | repz * |
| cmp | COMPARISON | test, cmp |
| lea | ADDRESS CALCULATION | lea |

| FUNCTION NAME | SCORE (SIMILARITY) |
|---|---|
| functionA | 43.5 |
| functionB | 33.1 |
| functionC | 10.3 |
| functionD | 5.3 |
| functionE | 0 |
| functionF | 0 |

DEVICE, METHOD, AND COMPUTER PROGRAM FOR SUPPORTING SPECIFICATION

CROSS-REFERENCE TO RELATED APPLICATIONS

The present application is based on PCT filing PCT/JP2018/017787, filed May 8, 2018, which claims priority to JP 2017-116668, filed Jun. 14, 2017, the entire contents of each are incorporated herein by reference.

FIELD

The present invention relates to a device, a method, and a computer program for supporting specification.

BACKGROUND

Because vulnerability of software is used for malware infection and the like and may cause serious damage to a user, the vulnerability of software is immediately corrected by each software vendor as soon as the vulnerability is found or reported. In addition, measures against vulnerability can be taken by distribution of executable files and the like. Thus, information on a part of corrected vulnerability is hardly released. By contrast, information related to a part of corrected vulnerability is important information for developers of security products and the like.

Conventionally, there has been known a technique of performing analysis using a binary comparison tool for finding and comparing semblance functions between executable files (for example, see Non Patent Literature 1). In addition, there has been developed the DarunGrim technique of focusing on a part of a function that is increased after correction at the time of a patch difference, keeping score referred to as security implication score (SIS) based on features of a vulnerability correction part, and assisting analysis (for example, see Non Patent Literature 2).

CITATION LIST

Non Patent Literature

Non Patent Literature 1: H. Flake, "Structural comparison of executable objects," in DIMVA, 2004, pp. 161-173.

Non Patent Literature 2: ExploitSpotting: Locating Vulnerabilities Out Of Vendor Patches Automatically, Black Hat USA 2010, Las Vegas, USA. Jeongwook "Matt" Oh

SUMMARY

Technical Problem

However, in the conventional technique, when knowledge and experience of an analyst are insufficient, vulnerability of software may be unable to be analyzed. For example, even when one part in a source code is corrected, a plurality of parts may be changed in an executable file before and after the correction due to a difference in compiler and link environment. In this case, an analyst is required to have deep knowledge and various experience in order to specify a correction part of vulnerability from a comparison result of executable files before and after correction by a binary comparison tool. In DarunGrim, a function to be focused on and a scoring method are determined based on experience of an analyst. Thus, it is difficult to perform analysis if knowledge and experience of an analyst are insufficient.

Solution to Problem

To solve a problem and to achieve an object, a device for supporting specification, the device includes: a first difference extracting unit that extracts, from an executable file converted from a source code and an executable file converted from a source code after vulnerability correction is made to the source code, a difference of a part where the vulnerability correction is made; a feature calculating unit that calculates features of the difference extracted by the first difference extracting unit; a second difference extracting unit that extracts, from an executable file converted from a source code and an executable file converted from a source code after correction is made to the source code, a difference of a predetermined part; and a similarity calculating unit that calculates similarity between the difference of the predetermined part calculated by the second difference extracting unit and the features of the difference of the part where the vulnerability correction is made calculated by the feature calculating unit.

Advantageous Effects of Invention

According to the present invention, even when knowledge and experience of the analyst are insufficient, vulnerability of software can be analyzed.

BRIEF DESCRIPTION OF DRAWINGS

FIG. 2 is a view for illustrating specification of a correction part by the device for supporting specification according to the first embodiment.

FIG. 3 is a view for illustrating specification of a function by the device for supporting specification according to the first embodiment.

FIG. 4 is a view illustrating an example of a program code.

FIG. 5 is a view for illustrating extraction of a difference by the device for supporting specification according to the first embodiment.

FIG. 6 is a view illustrating an example of a normalization rule of instructions.

DESCRIPTION OF EMBODIMENT

An embodiment of a device, a method, and a computer program for supporting specification according to the present application will be described in detail with reference to the accompanying drawings. It should be noted that the present invention is not limited to the embodiment described below.

Configuration of First Embodiment

Figure 1:
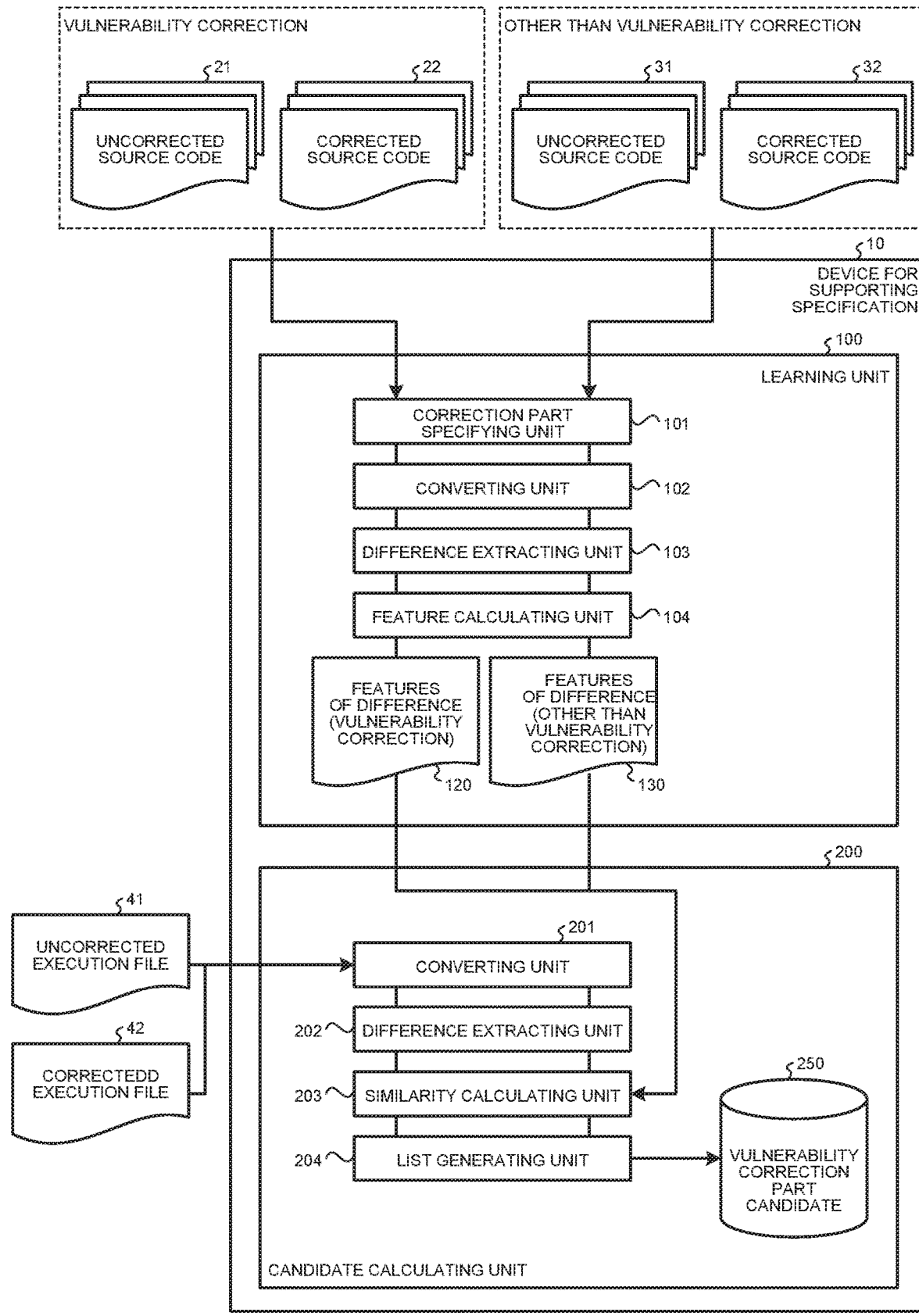
FIG. 1 is a view illustrating an example of the configuration of a device for supporting specification according to a first embodiment.

With reference to FIG. 1, the configuration of a device for supporting specification according to a first embodiment is described. FIG. 1 is a view illustrating an example of the configuration of the device for supporting specification according to the first embodiment. As illustrated in FIG. 1, a device for supporting specification 10 includes a learning unit 100 and a candidate calculating unit 200.

The learning unit 100 learns features of vulnerability correction and features of correction other than the vulnerability correction. Based on features learned by the learning unit 100, the candidate calculating unit 200 calculates, among correction parts of software, correction parts where vulnerability correction is made.

As used herein, vulnerability means, among bugs (malfunction) existing in software, bugs that can be exploited by a third party. When being exploited through infection of malware and the like, software having vulnerability may cause great damage to a user. As soon as vulnerability is found or reported, the vulnerability is immediately corrected by each software vendor in order to minimize damage. In addition, information on corrected vulnerability is released on a vulnerability database (Common Vulnerabilities and Exposures (CVE)) and websites of software vendors, and the like. In this case, the released information covers various items such as the kinds and severity of vulnerability, but specific information such as correction parts of vulnerability in software is hardly published.

The learning unit 100 receives an uncorrected source code 21 and a corrected source code 22 that are source codes before and after vulnerability correction is made, and an uncorrected source code 31 and a corrected source code 32 that are source codes before and after correction other than the vulnerability correction is made. The candidate calculating unit 200 receives an uncorrected executable file 41 and a corrected executable file 42 that are executable files before and after predetermined correction is made. The device for supporting specification 10 of the present embodiment supports, among correction parts in the corrected executable file 42, specification of a part where vulnerability correction is made.

As used herein, a source code means what a series of instructions to a computer is described using a programming language. In addition, an executable file means what a source code is converted into a format that can be understood and executed by a computer using a compiler. A compiler is software for converting a source code described in a high-level language into a format that can be executed by a computer. Compilation means conversion processing performed by a compiler.

Configuration of Learning Unit

As illustrated in FIG. 1, the learning unit 100 includes a correction part specifying unit 101, a converting unit 102, a difference extracting unit 103, and a feature calculating unit 104. In addition, the learning unit 100 calculates features of a difference before and after vulnerability correction 120 and features of a difference before and after correction other than the vulnerability correction 130. The following describes processing in which the learning unit 100 calculates the features of a difference 120 using the uncorrected source code 21 and the corrected source code 22. By similar processing, the learning unit 100 can calculate the features of a difference 130 using the uncorrected source code 31 and the corrected source code 32.

The correction part specifying unit 101 compares the uncorrected source code 21 with the corrected source code 22, and specifies a part where a difference is generated. FIG. 2 is a view for illustrating specification of a correction part by the device for supporting specification according to the first embodiment. As illustrated in FIG. 2, the correction part specifying unit 101 acquires the number of lines of a part where a difference is generated using a diff program and the like. In the example of FIG. 2, the correction part specifying unit 101 specifies 5 lines from the 193rd line in the corrected source code 22 as a correction part.

The correction part specifying unit 101 specifies a function including a part where the specified difference is generated. The correction part specifying unit 101 acquires the top line and the end line of each function using source code analysis software such as ctags. For example, the correction part specifying unit 101 acquires the top line of a function, searches for a terminal symbol based on the top line, and defines a line in which the terminal symbol exists as the end line.

FIG. 3 is a view for illustrating specification of a function by the device for supporting specification according to the first embodiment. As illustrated in FIG. 3, the correction part specifying unit 101 acquires the 178th line as the top line of the BN_hex2bn function, and acquires the 252nd line as the end line. Because the BN_hex2bn function is defined from the 178th line to the 252nd line, the correction part specifying unit 101 specifies the correction part of 5 lines from the 193rd line as a difference part of the BN_hex2bn function. In other words, the correction part specifying unit 101 specifies the fact that the BN_hex2bn function includes a correction part.

The converting unit 102 converts a source code and an executable file into a predetermined format. The converting unit 102 compiles the uncorrected source code 21 and the corrected source code 22 using the same compiler with the same compiler option, and after that, disassembles the compiled uncorrected source code 21 and corrected source code 22.

As used herein disassembling means processing for converting a format that can be executed by a computer into a source code described in an assembly language. By contrast, assembling means processing for converting a source code described in an assembly language that is a low-level language into a format that can be executed by a computer. Software for assembling is referred to as an assembler. Similarly, software for disassembling is referred to as a disassembler. Hereinafter, a computer program obtained by reassembling is referred to as a program code.

FIG. 4 is a view illustrating an example of a program code. FIG. 4 is a program code obtained after the converting unit 102 reassembles the BN_hex2bn function. As illustrated in FIG. 4, in a program code, each instruction is described as a machine language instruction.

The converting unit 102 can use the known disassembling methods. As the known disassembling methods, there have been known a method using a linear sweep method and a recursive traversal method (Reference Literature 1: B. Schwarz, S. K. Debray, and G. R. Andrews. Disassembly of executable code revisited. In Proc. IEEE 2002 Working Conference on Reverse Engineering (WCRE), October 2002.) and a method using a probability model (Reference Literature 2: Japanese Patent No. 5009186).

The difference extracting unit 103 extracts, from an executable file converted from a source code and an executable file converted from a source code after vulnerability correction is made to the source code, a difference of a part where the vulnerability correction is made. The difference extracting unit 103 can further extract, from an executable file converted from a source code and an executable file converted from a source code after correction aimed at a measure other than a vulnerability measure is made to the source code, a difference of a part where the correction aimed at the measure other than the vulnerability measure is made. During this process, in the present embodiment, the difference extracting unit 103 extracts a difference of an executable file based on a program code obtained after disassembling performed by the converting unit 102.

The difference extracting unit 103 extracts a difference before and after correction from a program code of a function that is specified to have a correction part. The difference extracting unit 103 can extract a difference in any unit of not only function unit but also basic block unit and machine language instruction unit. A function means a mass of program codes of specific procedures for achieving a specific purpose that exists in software. By contrast, a basic block means a mass of program codes that has one entrance and one exit and does not contain a branch therein.

The difference extracting unit 103 can extract a difference based on at least one of the machine language instruction, the calling function, and the immediate value. The difference extracting unit 103 can extract a difference of the number of times of appearance of predetermined information in the executable files before and after the correction. The difference extracting unit 103 can extract an increased amount and a decreased amount of predetermined information in the executable files before and after the correction as a difference. For example, the difference extracting unit 103 extracts, in a correction part of a program code, an increased amount or a decreased amount of the number of times of appearance of the machine language instruction of "push" before and after correction as a difference.

The difference extracting unit 103 may extract a difference after normalizing and abstracting each element. With reference to FIG. 5, a method for extracting a difference after normalizing each element is described. FIG. 5 is a view for illustrating extraction of a difference by the device for supporting specification according to the first embodiment. As illustrated in FIG. 5(1), the difference extracting unit 103 extracts, from a list of machine language instructions included in a correction part before vulnerability correction and a list of machine language instructions included in a correction part after the vulnerability correction, an increased amount of an appearance instruction set as an increased amount instruction set. For example, when the machine language instruction of "mov" appears once in a correction part before vulnerability correction and the machine language instruction of "mov" appears three times in a correction part after the vulnerability correction, one time from three times leaves two, and the difference extracting unit 103 has the two machine language instructions of "mov" included in the increased amount instruction set. The difference extracting unit 103 executes the similar processing on the other machine language instructions.

As illustrated in FIG. 5(2), the difference extracting unit 103 normalizes the increased amount instruction set. The difference extracting unit 103 performs normalization by replacing machine language instructions with normalization instructions based on a normalization rule illustrated in FIG. 6. FIG. 6 is a view illustrating an example of a normalization rule of instructions. As illustrated in FIG. 6, for example, all of the machine language instructions of "jns", "jle", "jne", "jge", "jae", "jmp", "js", "jl", "je", "jg", "ja", "jb", and "jbe" are the "branch" as the kind of instructions, and are replaced with "jump". As illustrated in FIG. 5(3), the difference extracting unit 103 extracts an appearance frequency for each normalization instruction in the increased amount instruction set after normalization as a difference.

The feature calculating unit 104 calculates features of the difference extracted by the difference extracting unit 103. For example, the feature calculating unit 104 may learn the difference extracted by the difference extracting unit 103, and create a linear classifier. For example, when receiving a difference before and after correction of an executable file the correction purpose of which is unknown, a liner classifier created by the difference extracting unit 103 outputs similarity between the difference and a difference before and after vulnerability correction.

As described above, the difference extracting unit 103 extracts not only a difference of a correction part of vulnerability correction but also a difference of a correction part other than the vulnerability. Thus, the feature calculating unit 104 may generate an algorithm of cluster analysis for classifying a difference due to correction into a cluster of vulnerability correction and a cluster of correction other than the vulnerability.

Configuration of Candidate Calculating Unit

As illustrated in FIG. 1, the candidate calculating unit 200 includes a converting unit 201, a difference extracting unit 202, a similarity calculating unit 203, and a list generating unit 204. In addition, the candidate calculating unit 200 generates a vulnerability correction part candidate 250.

The converting unit 201 converts an executable file into a predetermined format. The converting unit 201 disassembles the uncorrected executable file 41 and the corrected executable file 42 so as to convert the uncorrected executable file 41 and the corrected executable file 42 into a program code. By a method similar to the method of the converting unit 102, the converting unit 201 performs disassembling.

The difference extracting unit 202 extracts, from the uncorrected executable file 41 converted from a source code and the corrected executable file 42 converted from a source code after correction is made to the source code, a difference of a part where the vulnerability correction is made. In the present embodiment, the difference extracting unit 202 extracts a difference of the executable files based on a program code obtained after disassembling performed by the converting unit 201. Source codes that are the source of the uncorrected executable file 41 and the corrected executable file 42 are unnecessary for extraction of a difference performed by the difference extracting unit 202. In addition, whether correction made to the uncorrected executable file 41 is vulnerability correction may be unknown.

Similarly to the difference extracting unit 103, the difference extracting unit 202 extracts a difference before and after correction from a program code. Similarly to the difference extracting unit 103, the difference extracting unit 202 can extract a difference in any unit of not only function unit but also basic block unit and machine language instruction unit. Similarly to the difference extracting unit 103, the difference extracting unit 202 can extract a difference based on at least one of the machine language instruction, the calling function, and the immediate value. Similarly to the difference extracting unit 103, the difference extracting unit 202 can extract a difference of the number of times of appearance of predetermined information in the executable files before and after the correction. Similarly to the difference extracting unit 103, the difference extracting unit 202 can extract an increased amount and a decreased amount of predetermined information in the executable files before and after the correction as a difference. Similarly to the difference extracting unit 103, the difference extracting unit 202 may extract a difference after normalizing and abstracting each element.

The similarity calculating unit 203 calculates similarity between a difference of a predetermined part calculated by the difference extracting unit 202 and features of a difference of a part where correction aimed at a vulnerability measure is made calculated by the feature calculating unit 104. In addition, the similarity calculating unit 203 calculates similarity between a difference of a predetermined part calculated by the difference extracting unit 202 and features of a difference of a part where correction aimed at a measure other than the vulnerability measure is made calculated by the feature calculating unit 104.

For example, the similarity calculating unit 203 may input the difference extracted by the difference extracting unit 202 into a linear classifier created by the feature calculating unit 104 and cause the linear classifier to output similarity between the difference and a difference before and after vulnerability correction. In addition, the similarity calculating unit 203 may classify the difference extracted by the difference extracting unit 202 into any one of the cluster of vulnerability correction and the cluster of correction other than vulnerability using an algorithm of cluster analysis generated by the feature calculating unit 104.

Figures 7, 8:
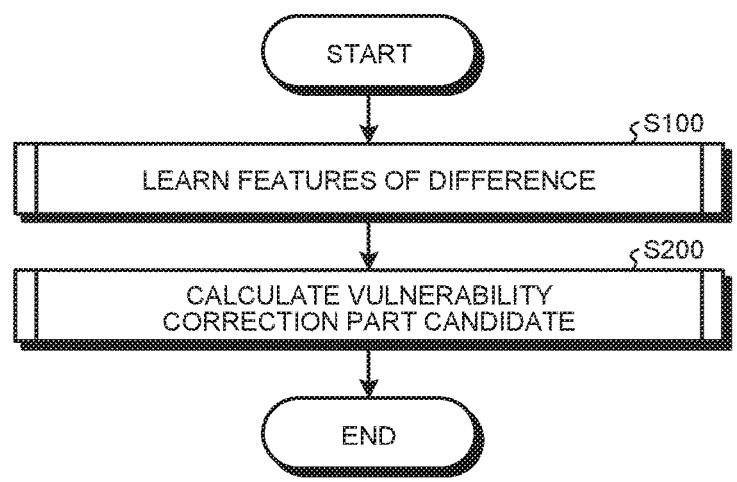
FIG. 7 is a view illustrating an example of vulnerability correction part candidates.
FIG. 8 is a flowchart illustrating a flow of processing of the device for supporting specification according to the first embodiment.

The list generating unit 204 generates and outputs a list of similarity for each correction part calculated by the similarity calculating unit 203. For example, the list generating unit 204 generates a list of similarity for each function included in the corrected executable file 42, and outputs the generated list as the vulnerability correction part candidate 250. FIG. 7 is a view illustrating an example of vulnerability correction part candidates. As illustrated in FIG. 7, in the vulnerability correction part candidate 250, similarity for each function is represented as the score. For example, the similarity with features of a difference of vulnerability correction of the functionA function is 43.5. For example, the similarity with features of a difference of vulnerability correction of the functionD function is 5.3.

Processing of First Embodiment

Figure 9:
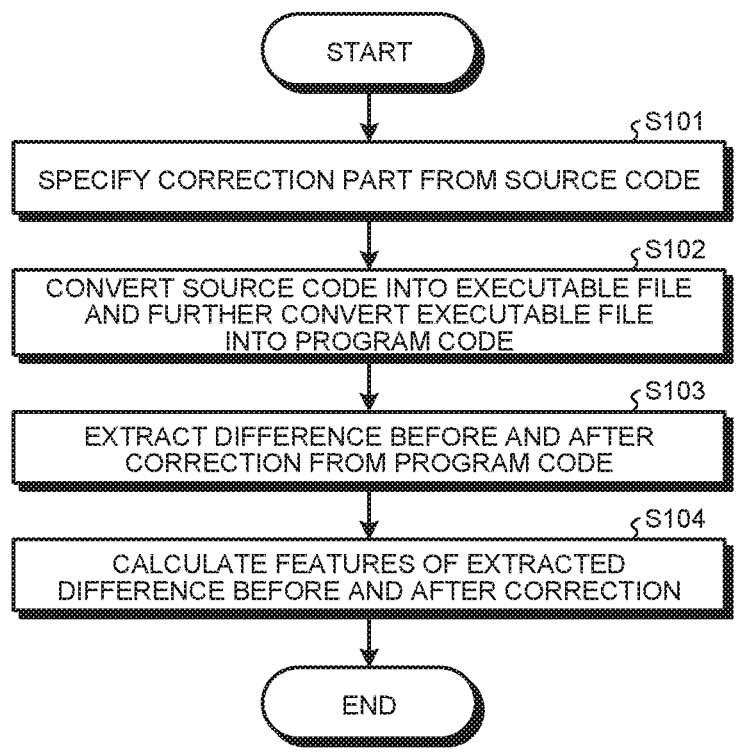
FIG. 9 is a flowchart illustrating a flow of processing of the device for supporting specification according to the first embodiment.
Figure 10:
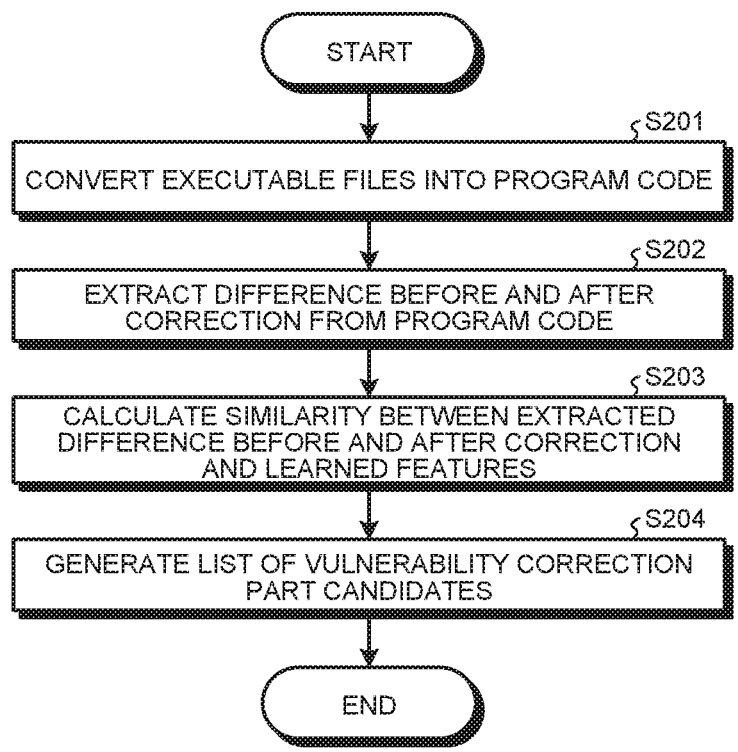
FIG. 10 is a flowchart illustrating a flow of processing of the device for supporting specification according to the first embodiment.

With reference to FIGS. 8 to 10, a flow of processing of the device for supporting specification 10 is described. FIGS. 8 to 10 are flowcharts illustrating the flow of processing of the device for supporting specification according to the first embodiment. As illustrated in FIG. 8, the learning unit 100 learns features of a difference between a correction part where vulnerability correction is made and a correction part where correction other than the vulnerability correction is made (step S100). Subsequently, the candidate calculating unit 200 calculates, based on the features of a difference learned by the learning unit 100, a candidate of a part where vulnerability correction is made from an executable file where correction is made (step S200).

With reference to FIG. 9, step S100 in FIG. 8 is described in detail. As illustrated in FIG. 9, the correction part specifying unit 101 specifies a correction part from a source code (step S101). The converting unit 102 converts the source code into an executable file, and further converts the executable file into a program code (step S102). The converting unit 102 can perform conversion using, for example, a compiler and a disassembler. The difference extracting unit 103 extracts a difference before and after correction from a program code (step S103). The difference extracting unit 103 can extract, for example, an increased amount and a decreased amount of a machine language instruction before and after correction as a difference. In addition, the feature calculating unit 104 calculates features of a difference before and after correction extracted by the difference extracting unit 103 (step S104). For example, the feature calculating unit 104 may create a linear classifier based on features of a difference.

With reference to FIG. 10, step S200 in FIG. 8 is described in detail. The converting unit 201 converts the executable files before and after the correction into a program code (step S201). The difference extracting unit 202 extracts a difference before and after correction from a program code (step S202). The similarity calculating unit 203 calculates similarity between a difference before and after correction extracted by the difference extracting unit 202 and features learned by the learning unit 100 (step S203). For example, the similarity calculating unit 203 may calculate similarity using a linear classifier created by the feature calculating unit 104. The list generating unit 204 generates a list of vulnerability correction part candidates (step S204).

Effects of First Embodiment

The difference extracting unit 103 extracts, from an executable file converted from a source code and an executable file converted from a source code after vulnerability correction is made to the source code, a difference of a part where the vulnerability correction is made. The feature calculating unit 104 calculates features of the difference extracted by the difference extracting unit 103. The difference extracting unit 202 extracts, from an executable file converted from a source code and an executable file converted from a source code after correction is made to the source code, a difference of a predetermined part. The similarity calculating unit 203 calculates similarity between a difference of a predetermined part calculated by the difference extracting unit 202 and features of a difference of a part where vulnerability correction is made calculated by the feature calculating unit 104. According to the present embodiment, an analyst only has to input the executable files before and after the correction into the device for supporting specification 10, and processing related to specification of a candidate of a vulnerability correction part is automatically performed by the device for supporting specification 10. According to the present embodiment, even when knowledge and experience of an analyst are insufficient, software can be analyzed.

The difference extracting unit 103 and the difference extracting unit 202 can extract a difference in any unit of function unit, basic block unit, and machine language instruction unit. In addition, the difference extracting unit 103 and the difference extracting unit 202 can extract a difference based on at least one of the machine language instruction, the calling function, and the immediate value. The difference extracting unit 103 and the difference extracting unit 202 can extract a difference of the number of times of appearance of predetermined information in the executable files before and after the correction. Thus, even when knowledge and experience of an analyst are insufficient, the device for supporting specification 10 can perform analysis based on the predetermined standard.

The difference extracting unit 103 and the difference extracting unit 202 can extract an increased amount and a decreased amount of predetermined information in the executable files before and after the correction as a difference. Extracting not only an increased amount but also a decreased amount as a difference in this manner enables specification of a correction part of vulnerability incapable of being specified with only the increased amount.

The difference extracting unit 103 can further extract, from an executable file converted from a source code and an executable file converted from a source code after correction other than vulnerability correction is made to the source code, a difference of a part where the correction other than the vulnerability correction is made. During this process, the similarity calculating unit 203 calculates similarity between a difference of a predetermined part calculated by the difference extracting unit 202 and features of a difference of a part where correction other than vulnerability correction is made calculated by the feature calculating unit 104. Calculating similarity with not only vulnerability correction but also correction other than the vulnerability enables a candidate of the vulnerability correction to be specified with higher precision.

System Configuration and the Like

Each component in each of the illustrated devices is a functional concept, and is not necessarily configured physically as illustrated. In other words, a specific embodiment of distributing/integrating each of the devices is not limited to the illustrated one, and all of or a part of the devices can be configured to be functionally or physically distributed/integrated in a certain unit depending on various kinds of loads, use situations, and the like. In addition, all of or a certain part of the processing function executed by each of the devices can be implemented by a central processing unit (CPU) and a computer program analyzed and executed by the CPU, or can be implemented as hardware of the wired logic.

In each processing described in the present embodiment, all of or a part of the processing described as automatically processed one can be performed manually, or all of or a part of the processing described as manually processed one can be performed automatically with a well-known method. Except as otherwise specifically described, any modifications can be made to processing procedures, control procedures, specific names, and information including various kinds of data and parameters shown in the specifications and drawings.

Computer Program

As one embodiment, the device for supporting specification 10 can implement a computer program for supporting specification that executes the specification support of a vulnerability correction part as package software and online software by installing the computer program for supporting specification on a desired computer. For example, by causing an information processing device to execute the computer program for supporting specification, the information processing device can be functioned as the device for supporting specification 10. Examples of the information processing device include desktop and laptop personal computers. Furthermore, examples of the information processing device include mobile communication terminals such as a smartphone, a cell-phone, and a personal handyphone system (PHS) and slate terminals such as a personal digital assistant (PDA).

The device for supporting specification 10 can be implemented as a server device for supporting specification that provides a service related to the specification support of a vulnerability correction part to a client, where the server device's client is a terminal device that a user uses. For example, the server device for supporting specification is implemented as a server device that provides a service for supporting specification in which the executable files before and after the correction are an input and a candidate of a vulnerability correction part is an output. In this case, the server device for supporting specification may be implemented as a web server, or may be implemented as a cloud that provides a service related to the specification support of a vulnerability correction part through outsourcing.

Figure 11:
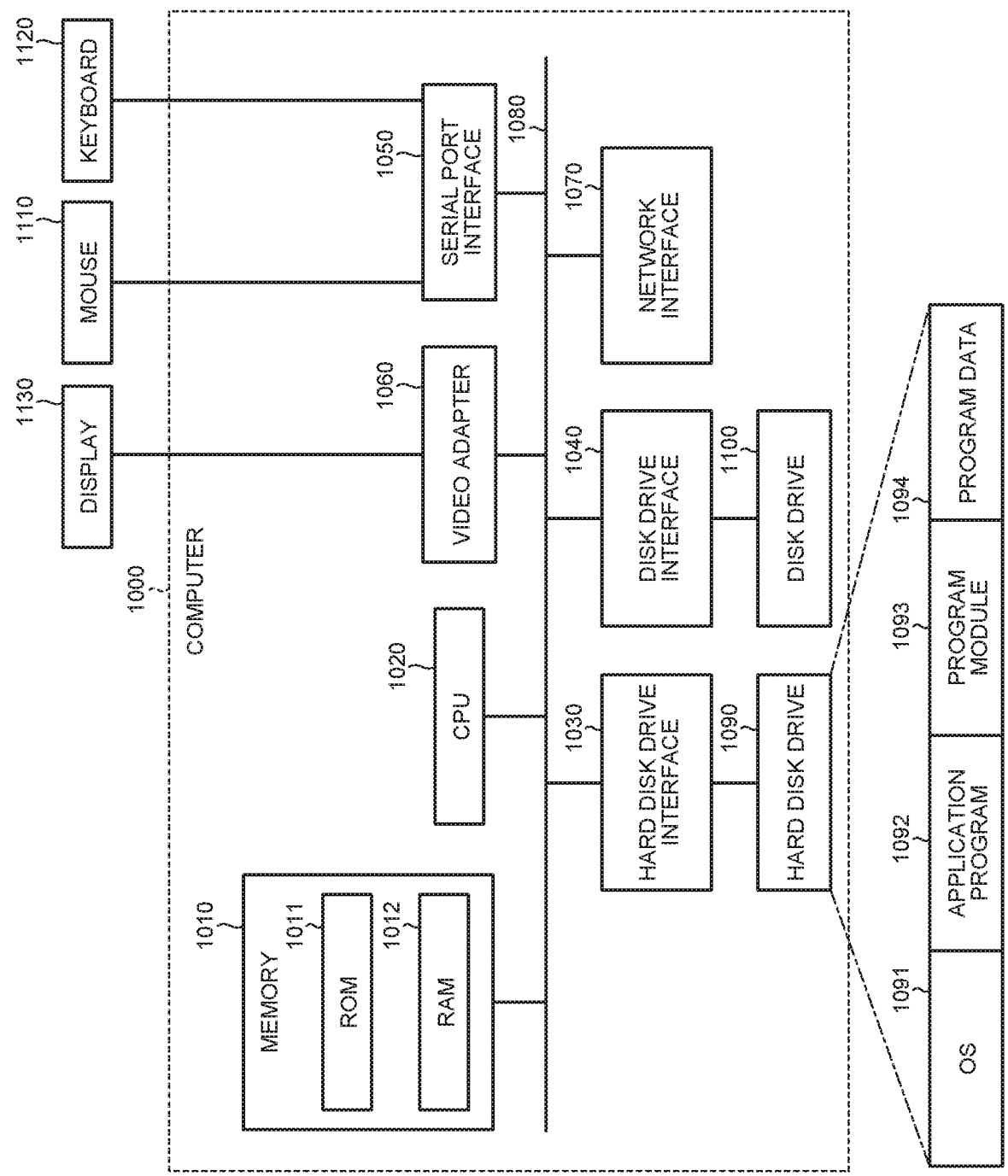
FIG. 11 is a view illustrating an example of a computer that executes a computer program for supporting specification.

FIG. 11 is a view illustrating an example of a computer that executes the computer program for supporting specification. A computer 1000 includes, for example, a memory 1010 and a CPU 1020. In addition, the computer 1000 includes a hard disk drive interface 1030, a disk drive interface 1040, a serial port interface 1050, a video adapter 1060, and a network interface 1070. Each of the units is connected through a bus 1080.

The memory 1010 includes a read only memory (ROM) 1011 and a random access memory (RAM) 1012. The ROM 1011 stores therein boot programs such as a basic input output system (BIOS). The hard disk drive interface 1030 is connected to a hard disk drive 1090. The disk drive interface 1040 is connected to a disk drive 1100. Attachable and detachable storage media such as a magnetic disk and an optical disk are inserted into the disk drive 1100. The serial port interface 1050 is connected to, for example, a mouse 1110 and a keyboard 1120. The video adapter 1060 is connected to, for example, a display 1130.

The hard disk drive 1090 stores therein, for example, an operating system (OS) 1091, an application program 1092, a program module 1093, and program data 1094. In other words, a computer program for specifying each processing of the device for supporting specification 10 is implemented as the program module 1093 in which a code that can be executed by a computer is described. The program module 1093 is stored in, for example, the hard disk drive 1090. For example, the program module 1093 for executing processing similar to the processing of the functional configuration in the device for supporting specification 10 is stored in the hard disk drive 1090. The hard disk drive 1090 may be replaced with a solid state drive (SSD).

Setting data used for processing in the embodiment described above is stored in, for example, the memory 1010 and the hard disk drive 1090 as the program data 1094. The CPU 1020 reads out the program module 1093 and the program data 1094 stored in the memory 1010 and the hard disk drive 1090 to the RAM 1012 as appropriate and executes the program module 1093 and the program data 1094.

The program module 1093 and the program data 1094 are not necessarily stored in the hard disk drive 1090, and may be stored in, for example, an attachable and detachable storage medium and be read out by the CPU 1020 through the disk drive 1100 and the like. Or, the program module 1093 and the program data 1094 may be stored in the other computer connected through networks (such as a local area network (LAN) and a wide area network (WAN)). The program module 1093 and the program data 1094 may be read out from the other computer through the network interface 1070 by the CPU 1020.

REFERENCE SIGNS LIST

10 DEVICE FOR SUPPORTING SPECIFICATION
21, 31 UNCORRECTED SOURCE CODE
22, 32 CORRECTED SOURCE CODE
41 UNCORRECTED EXECUTABLE FILE
42 CORRECTED EXECUTABLE FILE

100 LEARNING UNIT
101 CORRECTION PART SPECIFYING UNIT
102, 201 CONVERTING UNIT
103, 202 DIFFERENCE EXTRACTING UNIT
104 FEATURE CALCULATING UNIT
120, 130 FEATURES OF DIFFERENCE
200 CANDIDATE CALCULATING UNIT
203 SIMILARITY CALCULATING UNIT
204 LIST GENERATING UNIT
250 VULNERABILITY CORRECTION PART CANDIDATE

The invention claimed is:

1. A device for supporting specification, the device comprising:
a memory; and
a processor coupled to the memory and programmed to execute a process comprising:
comparing a source code before vulnerability correction with a source code after the vulnerability correction made to the source code, and specifying a part where a difference is generated;
firstly extracting, from an executable file converted from the source code before the vulnerability correction and an executable file converted from the source code after the vulnerability correction, a difference of the part specified by the specifying;
calculating features of the difference extracted by the firstly extracting;
creating a linear classifier from the features of the difference;
secondly extracting, from an executable file converted from a source code before a correction and an executable file converted from the source code after a correction, a difference of a predetermined part; and
calculating similarity between the difference of the predetermined part extracted by the secondly extracting and the features of the difference of the part where the vulnerability correction is made, using the linear classifier.

2. The device for supporting specification according to claim 1, wherein the firstly extracting and the secondly extracting extract a difference in any one of function unit, basic block unit, and machine language instruction unit.

3. The device for supporting specification according to claim 1, wherein the firstly extracting and the secondly extracting extract a difference based on at least one of machine language instruction, calling function, and immediate value.

4. The device for supporting specification according to claim 1, wherein the firstly extracting and the secondly extracting extract a difference of number of times of appearance of predetermined information in the executable files before and after the correction.

5. The device for supporting specification according to claim 1, wherein the firstly extracting and the secondly extracting extract an increased amount and a decreased amount of predetermined information in the executable files before and after the correction as a difference.

6. The device for supporting specification according to claim 1, wherein
the firstly extracting further extracts, from an executable file converted from a source code and an executable file converted from a source code after correction other than vulnerability correction is made to the source code, a difference of a part where the correction other than the vulnerability correction is made, and
the calculating similarity calculates similarity between the difference of the predetermined part calculated by the secondly extracting and features of a difference of a part where the correction other than the vulnerability correction is made calculated by the calculating features.

7. A method for supporting specification executed by a computer, the method comprising:
comparing a source code before vulnerability correction with a source code after the vulnerability correction made to the source code, and specifying a part where a difference is generated;
firstly extracting, from an executable file converted from the source code before the vulnerability correction and an executable file converted from the source code after the vulnerability correction, a difference of the part specified by the specifying;
calculating features of the difference extracted by the firstly extracting;
creating a linear classifier from the features of the difference;
secondly extracting, from an executable file converted from a source code before a correction and an executable file converted from the source code after a correction, a difference of a predetermined part; and
calculating similarity between the difference of the predetermined part extracted by the secondly extracting and the features of the difference of the part where the vulnerability correction is made, using the linear classifier.

8. A non-transitory computer-readable recording medium having stored therein a program, for supporting specification, that causes a computer to execute a process comprising:
comparing a source code before vulnerability correction with a source code after the vulnerability correction made to the source code, and specifying a part where a difference is generated;
firstly extracting, from an executable file converted from the source code before the vulnerability correction and an executable file converted from the source code after the vulnerability correction, a difference of the part specified by the specifying;
calculating features of the difference extracted by the firstly extracting;
creating a linear classifier from the features of the difference;
secondly extracting, from an executable file converted from a source code before a correction and an executable file converted from the source code after a correction, a difference of a predetermined part; and
calculating similarity between the difference of the predetermined part extracted by the secondly extracting and the features of the difference of the part where the vulnerability correction is made, using the linear classifier.

* * * * *